(12) United States Patent
Turich et al.

(10) Patent No.: US 7,118,459 B2
(45) Date of Patent: Oct. 10, 2006

(54) DRESSING TOOL FOR PROFILING THE TIP AREA OF A THREADED GRINDING WHEEL

(75) Inventors: Antoine Turich, Munich (DE); Engelbert Schauer, Unterschleissheim (DE)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 11/189,416

(22) Filed: Jul. 26, 2005

(65) Prior Publication Data
US 2006/0021610 A1 Feb. 2, 2006

(30) Foreign Application Priority Data
Jul. 27, 2004 (EP) .................................. 04017740

(51) Int. Cl.
*B24B 53/075* (2006.01)
(52) U.S. Cl. .................. 451/47; 451/56; 125/11.04
(58) Field of Classification Search ............... 451/47, 451/72, 56, 5, 222, 547, 541; 125/11.01, 125/11.04
See application file for complete search history.

(56) References Cited

U.S. PATENT DOCUMENTS

| 3,602,209 | A | * | 8/1971 | Bocker .................... 125/11.03 |
| 4,175,537 | A | | 11/1979 | Wiener |
| 4,557,078 | A | * | 12/1985 | Brill ............................. 451/21 |
| 4,953,522 | A | * | 9/1990 | Vetter ....................... 125/11.01 |
| 4,993,194 | A | * | 2/1991 | Cadisch ...................... 451/253 |
| 6,012,972 | A | * | 1/2000 | Jankowski ................... 451/48 |
| 6,234,880 | B1 | * | 5/2001 | Scacchi ....................... 451/47 |
| 6,290,574 | B1 | * | 9/2001 | Thyssen ........................ 451/9 |
| 2004/0005843 | A1 | | 1/2004 | Breitschaft et al. |
| 2004/0235401 | A1 | | 11/2004 | Schauer |

FOREIGN PATENT DOCUMENTS

| DE | 2343494 | 10/1974 |
| DE | 4207511 | 9/1993 |
| DE | 10220513 | 11/2003 |
| DE | 10322181 | 12/2004 |
| EP | 1361012 | 11/2003 |

* cited by examiner

*Primary Examiner*—Robert A. Rose
(74) *Attorney, Agent, or Firm*—Robert L. McDowell

(57) ABSTRACT

A dressing tool for profiling the tip area of a threaded grinding wheel used for continuous generation grinding. Concave working faces (13) are arranged in a cylindrical surface of the dressing tool (7) and coated with an abrasive coating. The pitch (P) of said working faces (13) corresponds to the pitch of the grinding wheel (3). The dressing tool (7) can be brought into rolling engagement with the grinding wheel (3) under crossed axes.

6 Claims, 2 Drawing Sheets

DRESSING TOOL FOR PROFILING THE TIP AREA OF A THREADED GRINDING WHEEL

FILED OF THE INVENTION

The invention relates to a dressing tool for profiling the tip area of a threaded grinding wheel used for continuous generation grinding.

BACKGROUND OF THE INVENTION

Threaded grinding wheels are used for the continuous generation grinding of gear wheels. Because the grinding wheel is subjected to natural wear and tear during this process, it has to be dressed from time to time. In the dressing process, material is machined off the flanks of the thread (or the threads) of the grinding wheel which narrows the tip area of the thread (or the threads). Thus, in addition to the tool for profiling the grinding wheel, a tool is required to adapt the tip diameter of the grinding wheel. The tip diameter is reduced until the tip area of the thread(s) of the grinding wheel has again assumed the originally provided width.

Thus, the means for dressing the grinding wheel usually comprises two separate tools. The tool for profiling the flanks of the grinding wheel may be a dressing disk, for example. The grinding wheel is generally not dressed with these two tools at the location on the machine where the work piece, i.e., the gear wheel, is later machined. However, for reasons of precision, it is desired to perform the dressing process at the location where the grinding wheel subsequently machines the work pieces. Therefore, it has already been proposed (German patent application 102 20 513.2) to use an essentially cylindrical gear wheel to profile the flanks of a threaded grinding wheel. The gear wheel has an abrasive coating on the surface that is active in the dressing and is incorporated on the work piece spindle of the machine in place of the work piece. Because the sole purpose of said gear wheel is to profile the flanks of the grinding wheel, an additional means is required for adapting the tip diameter of the grinding wheel.

A modification of this work method provides using an essentially cylindrical roll having an abrasive coating on its circumference for adapting the tip diameter of a grinding wheel, with the gear wheel and the roll being joinable to the work piece spindle of the machine in an axially fixed and non-rotatable fashion (German patent application 103 22 181.6). When the grinding wheel is brought into engagement with the cylindrical roll after the profiling of the flanks of the wheel to adapt the tip diameter, material is removed from the tip area of the thread or the threads of the grinding wheel. In this process, sharp edges are created at the transition of the tip area into the flanks of the wheel. However, the edges create undesired machining stages in the tooth flanks of the gear wheel (unsteady profile transitions in the tooth base area) when a gear wheel is ground with the grinding wheel profiled in said manner.

The invention is based on the problem of creating a dressing tool of the type mentioned earlier, which enables a profiling of the tip area of the thread (or the threads) of the grinding wheel with rounded edges.

SUMMARY OF THE INVENTION

In accordance with the invention, this problem is solved in that concave working faces are arranged in a cylindrical surface of a dressing tool, with the pitch of the abrasively coated working faces corresponding to the pitch of the grinding wheel, and that the dressing tool can be brought into rolling engagement with the grinding wheel under crossed axes.

When a dressing tool developed in this manner rolls off on the grinding wheel, the abrasively coated concave working faces of the dressing tool come into engagement with the tip area of the thread or the threads of the grinding wheel. Material is machined off the tip area and the tip diameter of the grinding wheel is reduced as required. Due to the concave profile of the working faces, a rounded off transition, rather than a sharp edge, is created at the transition between the tip area and the flanks of the grinding wheel. With a suitable curvature of the concave working faces, any desired profile of the tip area of the thread of the grinding wheel can be generated. Similar to a gear wheel, the concave working faces of the dressing tool may also be developed with specific helix angles. Preferably, the helix angle corresponds to the helix angle of the dressing gear wheel used for the profiling.

DETAILED DESCRIPTION OF THE PREFERRED EMBODIMENT

Figure 1:
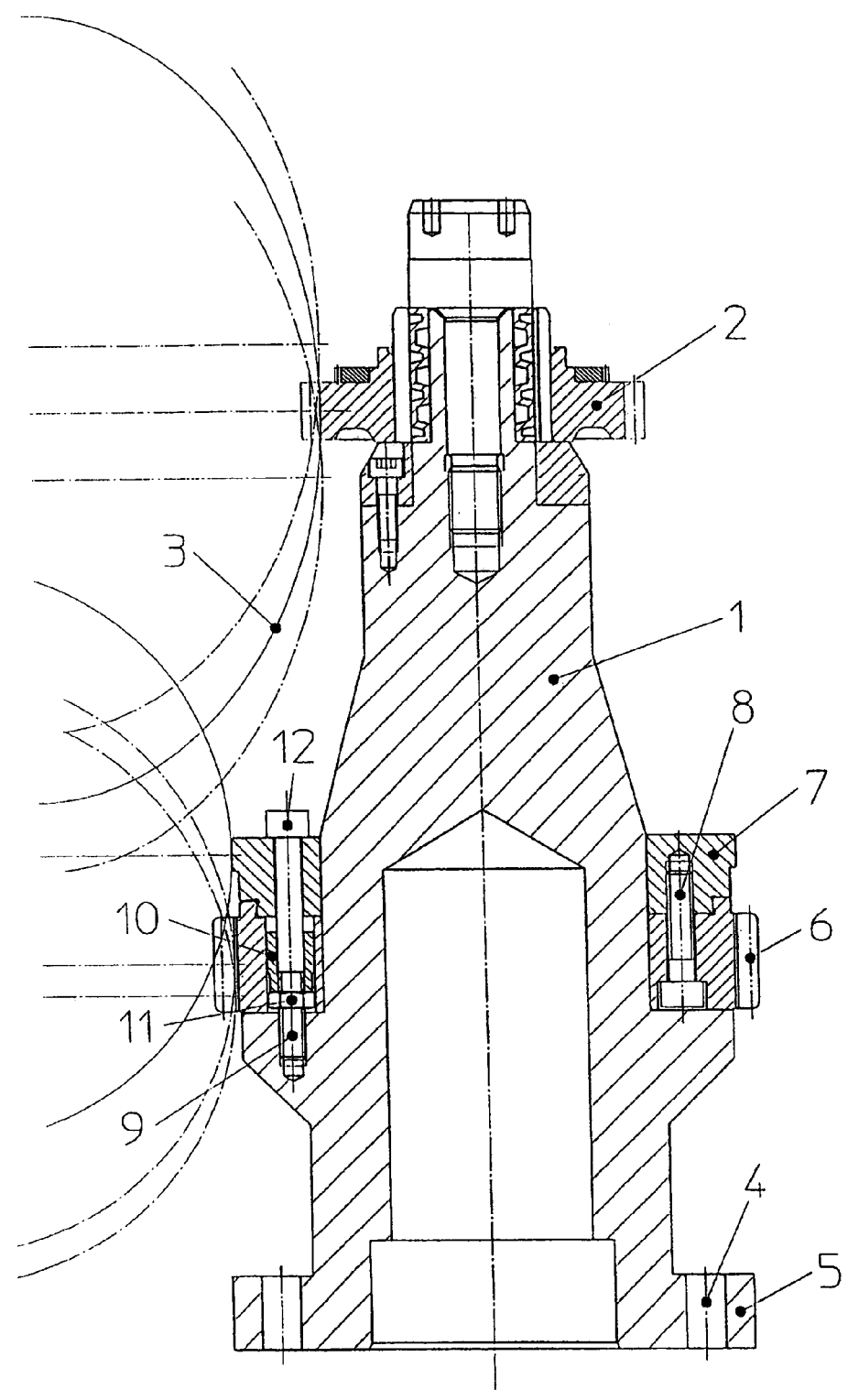
FIG. 1 illustrates a longitudinal section a work piece spindle of a machine for the continuous generation grinding of gear wheels.

FIG. 1 shows in longitudinal section a work piece spindle of a machine for the continuous generation grinding of gear wheels in the tangential or diagonal process. In FIG. 1, a gear wheel 2 is clamped onto the upper free end of the work piece spindle, which is being machined with a cylindrical grinding wheel 3 indicated by an elliptical contour line. The grinding wheel 3 is arranged on a tool spindle (not shown) in a non-rotatable fashion. Because the structure of a machine used for the continuous generation grinding is principally known, a detailed explanation of the machine is not necessary.

The free end area of the work piece spindle 1 transitions through a conical area into a cylindrical area with an enlarged diameter, with a ring shoulder following the cylindrical area. On the other end, the work piece spindle 1 has a ring flange 5 which has borings 4 to attach to a drive shaft of the machine. A dressing tool for dressing the grinding wheel 3 is comprised of an essentially cylindrical dressing gear wheel 6 and an essentially cylindrical dressing tool 7.

Figure 2:
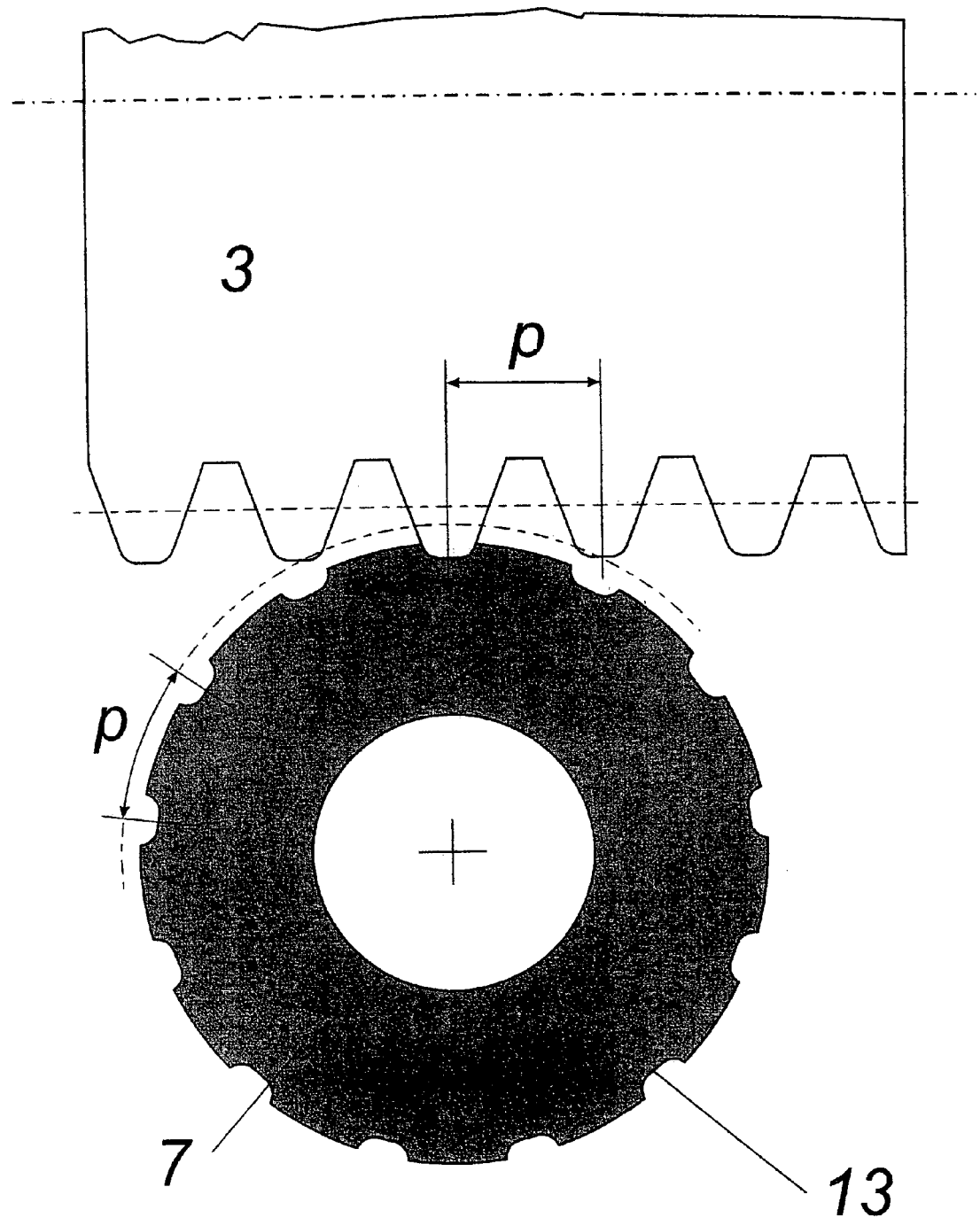
FIG. 2 shows a normal section through a grinding wheel and a dressing tool that engages with the grinding wheel in a rolling engagement to profile the tip area of the grinding wheel.

As shown in the representation in FIG. 2, concave working faces 13 are arranged in the cylindrical circumferential surface of the dressing tool 7. The pitch P of the working faces 13 of the dressing tool 7 corresponds to the pitch P of the grinding wheel 3. Like the teeth of the dressing gear wheel 6, the working faces 13 of the dressing tool 7 may be developed with specific helix angles. Preferably, the helix angle corresponds to the helix angle of the dressing gear wheel. In the embodiment shown, the concave working faces 13 of the dressing tool 7 are developed with a specific base radius. However, depending on the respective application, a different concave profile is also possible.

On its active dressing surface, i.e., in the area of the tooth flanks, the dressing gear wheel 6 has an abrasive coating. In the same way, the dressing tool 7 has an abrasive coating on its active dressing surface, i.e., in the area of the working faces 13. The dressing gear wheel 6 and the dressing tool 7 may be combined into one tool unit in the manner described in the following.

For the interdependent centering, the dressing gear wheel 6 and the dressing tool 7 have corresponding annular projections and/or recesses, and they have the same interior diameter, which is slightly larger than the outer diameter of the cylindrical area of the work piece spindle 1. As shown in the left half of FIG. 1, the dressing gear wheel 6 and the dressing tool 7 have a plurality, preferably three, axially aligned borings, with the borings developed in the dressing gear wheel having a larger diameter for the reasons explained in the following. Corresponding tapped holes 9 are arranged in the ring shoulder of the work piece spindle 1. Preferably, said axially aligned borings are positioned so that the center of the tooth spaces of the dressing gear wheel 6 and the center of the concave working faces 13 of the dressing tool 7 are positioned on a common helical surface.

In the assembly of the dressing tool unit, first a work-holding bolt 12 is inserted into the borings of the dressing gear wheel 6, and then a threaded bushing 10 is screwed onto the work-holding bolt and countered with a nut 11.

As shown in the right half of FIG. 1, the dressing gear wheel 6 has a plurality, preferably three, stepped borings across the circumference. The dressing tool 7 has corresponding tapped holes so that the dressing gear wheel 6 and the dressing tool 7 can be connected to the screws 8 in a non-rotatable fashion. This tool unit, which is formed by the dressing gear wheel 6 and the dressing tool 7, is arranged on the cylindrical area of the work piece spindle 1. The work-holding bolts 12 are then screwed into the assigned tapped holes 9 of the work piece spindle 1 so that the dressing gear wheel 6 abuts the ring shoulder of the work piece spindle. The outer diameter of the segment of the cylindrical area of the work piece spindle 1 adjacent to the ring shoulder is slightly larger, resulting in a press fit with the dressing gear wheel 6. The tool unit comprised of the dressing gear wheel 6 and the dressing tool 7 is therefore connected to the work piece spindle 1 in concentric arrangement in an axially fixed and non-rotatable fashion.

If the grinding wheel 3 needs to be dressed due to wear and tear, the tool spindle and the work piece spindle 1 of the machine are moved relatively toward each other to bring the grinding wheel 3 and the dressing gear wheel 6 into engagement under a suitable crossing angle. The flanks of the grinding wheel 3 are then profiled in a tangential or diagonal process. This only requires the technological variables such as in-feed, feed and rotation of the grinding wheel 3 to be adapted to the present dressing job. All movements required for the dressing of the grinding wheel in the tangential or diagonal process can be executed by the machine axes that are already available.

After the flanks of the grinding wheel 3 have been profiled with the dressing gear wheel 6, a relative movement of the work piece spindle 1 and the tool spindle arranges the grinding wheel 3 relative to the dressing tool 7. To be more specific, the grinding wheel 3 is brought into rolling engagement with the working faces 13 of the dressing tool 7 to adapt the tip diameter. When the grinding wheel 3 and the dressing tool 7 roll off on one another, the working faces 13 of the dressing tool 7 engage successively with the tip area of the thread or the threads of the grinding wheel 3. Because of the relative movement in the process, the working faces 13 remove material from the tip area of the threads at the grinding wheel. This reduced the tip diameter of the grinding wheel 3 as required, with a convex tip area being generated as required for the respective application case. The profiling of the flanks of the grinding wheel and the appropriate adaptation of the tip diameter is therefore performed in one work cycle.

If a gear wheel is machined with a grinding wheel dressed in this manner, a finely rounded profile of the tooth base can be obtained without interfering machining stages. To be more specific, the concave profile of the working faces 13 of the dressing tool 7 is reproduced at the tooth base of the gear wheel machined with the grinding wheel 3.

Principally, it would also be possible to generate the convex profile of the tooth tip of the grinding wheel 3 with an appropriately developed dressing gear wheel 6. For this purpose, the dressing gear wheel 6 would have to be brought into engagement with the thread or the threads of the grinding wheel 3 not only in the area of its tooth flanks but also in the area of the tooth base. However, it was shown in practice that it is extremely difficult to provide the dressing gear wheel 6 with an abrasive coating of the required quality in the area of the tooth gullet so that said area of the dressing gear wheel machines the tip area of the grinding wheel. The dressing tool 7, which is shown in FIG. 2 and described above, significantly simplifies the problem of producing this type of abrasive coatings in the area of the tooth base.

A standardized set of tool units, comprised of dressing gear wheel 6 and dressing tool 7, which have a uniform interior diameter, can be used for the dressing of differently profiled grinding wheels 3.

If the dressing gear wheel 6 has to be replaced due to wear and tear, the work-holding bolts 12 are screwed out of the tapped holes 9 of the work piece spindle 1. As a result, the threaded bushing 10, which is connected to the work-holding bolt 12 by the nut 11 in a non-rotatable fashion, abuts the roll 7. If the work-holding bolt 12 is screwed further out of the tapped hole 9, an axial force is exerted on the roll 7, which is transmitted to the dressing gear wheel 6 by the screws 8. Under said axial force, the dressing gear wheel 6 is pushed off the work piece spindle 1. As soon as the dressing gear wheel 6 has been displaced sufficiently axially relative to the work piece spindle 1, so that the press fit goes into a sliding fit, the tool unit comprised of dressing gear wheel 6 and dressing tool 7 can be pulled off the work piece spindle 1.

Preferably, the dressing tool and a gear wheel-shaped dressing wheel for profiling the wheel flanks of the grinding wheel are joinable in an axially fixed and non-rotatable fashion to the work piece spindle of a machine suitable for the continuous generation grinding. The fact that the dressing gear wheel for profiling the wheel flanks and the dressing tool for machining the tooth tip can be accommodated on the work piece spindle simplifies the loading concept. Further time savings result from the fact that the flanks of the grinding wheel can be dressed and the tip diameter of the grinding wheel can be adapted in one work cycle.

The dressing gear wheel and the dressing tool may be developed so that they are joinable independently of one another to the work piece spindle in an axially fixed and non-rotatable fashion. For various reasons, however, it is more advantageous that the dressing gear wheel and the dressing tool are connected to one another in a non-rotatable fashion, and that they are joinable as a tool unit with the work piece spindle in an axially fixed and non-rotatable fashion. The tool unit can also be developed in one piece.

The design of the dressing gear wheel and the dressing tool as a one-piece or two-piece tool unit enables a standardization in an advantageous manner. To dress different grinding wheels, a set of dressing gear wheels and dressing tools with uniform interior diameter, which differ only with respect to the outer diameter, the gear geometry and the gear data and/or the concave geometry, is sufficient.

The center of the tooth spaces of the dressing gear wheel and the center of the concave working faces of the dressing tool are preferably located on a common helical surface. This ensures a proper engagement with the grinding wheel even in case of a small axial distance between dressing gear wheel and dressing tool.

The contour of the working faces of the dressing tool preferably corresponds to the desired contour of the tooth base of a gear wheel to be machined with the grinding wheel.

In deviation from the shown embodiment, the dressing tool 7 could be provided with an abrasive material on its entire circumferential area. This would make it possible to use the cylindrical areas between the concave working faces 13 for a machining of the wheel tip.

LIST OF REFERENCE SYMBOLS:

1 Work piece spindle
2 Gear wheel
3 Grinding wheel
4 Borings
5 Ring flange
6 Dressing gear wheel
7 Dressing tool
8 Screws
9 Tapped hole
10 Threaded bushing
11 Nut
12 Work-holding bolt
13 Working faces While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. Dressing tool for profiling only the tip area of a threaded grinding wheel used for continuous generation grinding, said tool comprising:
   concave working faces (13) arranged in a cylindrical surface of the dressing tool (7) at a pitch (P), said working faces (13) being coated with an abrasive coating with said pitch (P) corresponding to the pitch of the grinding wheel (3), the dressing tool (7) being positionable into rolling engagement with the grinding wheel (3) under crossed axes.

2. The dressing tool of claim 1 being connectable in an axially fixed and non-rotatable fashion together with a gear wheel-shaped dressing gear wheel (6) to a work piece spindle (1) of a machine suitable for continuous generation grinding.

3. The dressing tool of claim 2 being coaxially connectable in a non-rotatable fashion to the gear wheel-shaped dressing wheel (6) to form a tool unit, said tool unit (6, 7) being connectable to the work piece spindle (1) of the machine in an axially fixed and non-rotatable fashion.

4. The dressing tool of claim 3, wherein the center of the tooth spaces of the dressing gear wheel (6) and the center of the concave working faces (13) of the dressing tool (7) are positioned on a common helical surface.

5. The dressing tool of claim 3 wherein the tool unit is developed in one piece.

6. The dressing tool of claim 1 wherein the contour of the working faces (13) corresponds to the desired contour of the tooth base of a gear wheel (2) to be machined with the grinding wheel (3).

* * * * *